(12) United States Patent
Vahedi et al.

(10) Patent No.: US 11,811,300 B2
(45) Date of Patent: Nov. 7, 2023

(54) ISOLATED CONVERTER

(71) Applicant: DCBEL INC., Montréal (CA)

(72) Inventors: Hani Vahedi, Brossard (CA); Marc-André Forget, Saint Lazare (CA)

(*) Notice: Subject to any disclaimer, the term of this patent is extended or adjusted under 35 U.S.C. 154(b) by 219 days.

(21) Appl. No.: 17/440,243

(22) PCT Filed: Apr. 14, 2020

(86) PCT No.: PCT/CA2020/050499
§ 371 (c)(1),
(2) Date: Sep. 17, 2021

(87) PCT Pub. No.: WO2020/206560
PCT Pub. Date: Oct. 15, 2020

(65) Prior Publication Data
US 2022/0181984 A1    Jun. 9, 2022

Related U.S. Application Data

(60) Provisional application No. 62/832,810, filed on Apr. 11, 2019.

(51) Int. Cl.
H02M 1/00 (2006.01)
H02M 3/335 (2006.01)
(Continued)

(52) U.S. Cl.
CPC ............ *H02M 1/007* (2021.05); *B60L 53/20* (2019.02); *H02M 3/33584* (2013.01);
(Continued)

(58) Field of Classification Search
CPC ............... H02M 1/007; H02M 7/4837; H02M 3/35584; H02M 7/04; H02M 7/797;
(Continued)

(56) References Cited

U.S. PATENT DOCUMENTS

| 5,355,294 A | 10/1994 | De Doncker et al. |
| 9,821,670 B2 | 11/2017 | Biagini |

(Continued)

FOREIGN PATENT DOCUMENTS

| CN | 105811460 A | 7/2016 |
| CN | 106452144 A | 2/2017 |
| WO | 2019/071359 A1 | 4/2019 |

OTHER PUBLICATIONS

International application No. PCT/CA2020/050499 International Search Report dated Jul. 9, 2020.
(Continued)

*Primary Examiner* — Robert L Deberadinis

(57) ABSTRACT

The present disclosure provides a method and apparatus for providing electrical isolation using a converter comprising a first converter working in a rectifier mode receiving AC current and providing DC current, a second converter working in an inverter mode receiving said DC current from said first converter and providing AC current, a transformer receiving said AC current from said second converter having an input and output, said transformer providing electric isolation between said input and output, a third converter working in a rectifier mode receiving AC current from said transformer and providing DC current, wherein at least one of said first, second and third converters is a multilevel converter.

31 Claims, 10 Drawing Sheets

(51) Int. Cl.
  H02M 7/483    (2007.01)
  B60L 53/20    (2019.01)
  H02M 7/797    (2006.01)
  H02M 7/04     (2006.01)
  H02M 1/42     (2007.01)

(52) U.S. Cl.
  CPC ........... *H02M 7/04* (2013.01); *H02M 7/4837* (2021.05); *H02M 7/797* (2013.01); *B60L 2210/10* (2013.01); *B60L 2210/40* (2013.01); *H02M 1/0009* (2021.05); *H02M 1/42* (2013.01)

(58) Field of Classification Search
  CPC ....... H02M 1/0009; H02M 1/42; B60L 53/20; B60L 2210/10; B60L 2210/40
  See application file for complete search history.

(56) References Cited

U.S. PATENT DOCUMENTS 9,969,273 B2   5/2018   Rozman et al.
2020/0070672 A1   3/2020   Vahedi et al.

OTHER PUBLICATIONS

International application No. PCT/CA2020/050499 Search Strategy dated Jul. 9, 2020.
International application No. PCT/CA2020/050499 Written Opinion of the International Searching Authority dated Jul. 9, 2020.
International application No. PCT/CA2020/050499 International Preliminary Report on Patentability Chapter II dated Jul. 9, 2021.
European application No. 20787785.3 the extended European search report dated Nov. 9, 2022.
Jin et al., ZVS Soft Switching Operation Range Analysis of Three-Level Dual-Active Bridge DC-DC Converter Under Phase Shift Control Strategy. IEEE Transactions on Industry Applications, IEEE Service Center, Piscataway, NJ, US, vol. 55, No. 2, Mar. 1, 2019 (Mar. 1, 2019), pp. 1963-1972.
Vahedi et al., A new five-level buck-boost active rectifier. 2015 IEEE International Conference on Industrial Technology (ICIT), IEEE, Mar. 17, 2015, pp. 2559-2564.
Vahedi et al., A Novel Multilevel Multioutput Bidirectional Active Buck PFC Rectifier. IEEE Transactions on Industrial Electronics, IEEE Service Center, Piscataway, NJ, USA, vol. 63, No. 9, Sep. 1, 2016 (Sep. 1, 2016), pp. 5442-5450.
Vahedi et al., Reduced DC-Link Voltage Active Power Filter Using Modified PUC5 Converter. IEEE Transactions on Power Electronics, Institute of Electrical and Electronics Engineers, USA, vol. 33, No. 2, Feb. 1, 2018 (Feb. 1, 2018), pp. 943-947.
Youssef et al., Packed U Cells Multilevel Converter Topology: Theoretical Study and Experimental Validation, IEEE Transactions on Industrial Electronics, IEEE Service Center, Piscataway, NJ, USA, vol. 58, No. 4, Apr. 1, 2011 (Apr. 1, 2011), pp. 1294-1306.
Tariq et al., Design of a proportional resonant controller for packed U cell 5 level inverter for grid-connected applications, 2016 IEEE International Conference on Power Electronics, Drives and Energy Systems (PEDES), IEEE, Dec. 14, 2016 (Dec. 14, 2016), pp. 1-6.
Al-Qatouni H et al., Statcom using Packed U-Cell 5-Level Converter with New Control Algorithm. 2018 2nd European Conference on Electrical Engineering and Computer Science (EECS), IEEE, Dec. 20, 2018 (Dec. 20, 2018), pp. 11-15.
Vahedi et al., Modified Seven-Level Pack U-Cell Inverter for Photovoltaic Applications. IEEE Journal of Emerging and Selected Topics in Power Electronics, IEEE, Piscataway, NJ, USA, vol. 6, No. 3, Sep. 1, 2018 (Sep. 1, 2018), pp. 1508-1516.
Goud et al., Grid Connected Renewable Energy Based EV Charger with Bidirectional AC/DC Converter. 2018 5th IEEE Uttar Pradesh Section International Conference on Electrical, Electronics and Computer Engineering (UPCON), IEEE, Nov. 2, 2018 (Nov. 2, 2018), pp. 1-6.

ISOLATED CONVERTER

The present application claims priority from U.S. provisional patent application No. 62/832,810 filed on Apr. 11, 2019, the content of which is incorporated herein by reference.

TECHNICAL FIELD

The present disclosure relates generally to the field of converters and more specifically to the converters providing galvanic isolation.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Although non-isolated converters are more common than the isolated converters, they have the disadvantage of an electrical connection between the input and output, for example a common ground. Many safety standards and/or customers require a separation from the applied input voltage and the output voltage, which is often user accessible.

This can be an issue when it comes to electrical vehicles isolated converters have high frequency transformer providing an isolation barrier which is generally able to withstand anything from a few hundred volts to several thousand volts, as can be required for medical applications. A second advantage of an isolated converter is that the output can be configured to be either positive or negative.

Electric vehicles ("EV") typically, use isolated converters which are both larger and more expensive than non-isolated solutions. The primary need for isolation is to satisfy safety requirements when going to higher power levels.

Therefore, there exists a need to improve the power conversion efficiency of such on-board converters while reducing, weight and volume. This has been more imperative considering popularity of EVs thanks to all the social and governmental push to reduce fossil fuel consumption and emissions of carbon dioxide and other greenhouse gases.

Furthermore, most available isolated converters use transformers which, while effective in terms of providing galvanic isolation required for EVs can be large and heavy.

Therefore, there exists a need to while benefiting from the transformers' ability to provide electrical isolation, reduce the size of these transformers without reducing the total efficiency of the converters.

SUMMARY

Applicant has found a method and apparatus for providing isolated conversion for different types of current that has high efficiency and can be implemented using a small transformer.

In one broad aspect, the present disclosure provides a method for providing electrical isolation using an isolated converter. The method includes providing the isolated converter with a first DC current, selecting a first frequency for converting the first DC current to a first AC current, converting the first DC current to the first AC with the first frequency using a first conversion circuit, providing the first AC current to a transformer and receiving a second AC current having electrical isolation from the first AC current. The selecting the first frequency of the first AC current determines a size of the transformer providing isolation. In some embodiments, by using a higher frequency the size of the transformer may be reduced.

It will be appreciated by those skilled in the art that the size of the transformer may depend on the desirable output voltage of the transformer.

In some examples of the present disclosure, the providing the isolated converter with the first DC current may include receiving a third AC current having a third frequency lower than the first frequency of the first AC current and converting the third AC current to the first DC current using a second converter circuit.

In some examples, one or more of the first converter circuit and the second converter circuit used for the conversion may be a multi-level converter circuit. In some examples, the multi-level converter circuit is a five-level active rectifier. An example of such power has been disclosed by the applicant in the international PCT patent application having serial number PCT/CA2018/051291 and publication number WO/2019/071359.

In some examples, the present method may further comprise converting the second AC current to a second DC current using a third converter circuit. This would provide a DC-DC isolated conversion between the input and output of the converter.

In one broad aspect, the present disclosure provides an isolated DC-DC converter comprising a first converter working in an inverter mode receiving DC current and providing AC current, a transformer receiving the AC current having an input and output, the transformer providing electric isolation between the input and output, a second converter working in a rectifier mode receiving AC current from the transformer and providing DC current. At least one of the first and second converters is a multi-level converter comprises an AC port, at least one DC port, a power converter component connected to the AC and at least one DC ports converting power between the AC port and DC port at a variable voltage. The power converter component includes at least one high-voltage capacitor for storing power at a voltage boosted above a peak voltage of the AC port and a circuit. The circuit comprises an inductor connected in series with the AC port, a low-voltage capacitor, two diodes or two high-voltage switches connected between a first AC port terminal and opposed ends of the high voltage capacitor; two intermediate low voltage power switches connected between the opposed end of the high-voltage capacitor and opposed ends of the low voltage capacitor, and two terminal low voltage power switches connected between the opposed ends of the low voltage capacitor and a second AC terminal. The DC port can be connected to the opposed ends of the high voltage capacitor. It also includes a controller having at least one sensor for sensing current and/or voltage in the circuit and connected to a gate input of the two intermediate low voltage power switches and the two terminal low voltage power switches.

In some embodiments, the controller is operative for causing the circuit to operate in a rectifier boost mode wherein a voltage of the high voltage capacitor is higher than a peak voltage of the AC port, and the two intermediate low voltage power switches and the two terminal low voltage power switches are switched with redundant switching states in response to a measurement of a voltage present at the low voltage capacitor so as to maintain the low voltage capacitor at a predetermined fraction of a desired voltage for the high voltage capacitor and to thus maintain the high voltage capacitor at a desired high voltage, with the circuit supplying a DC load and absorbing power as a five-level active rectifier with low harmonics on the AC port.

In some embodiments, the converter further comprises a controller interface which communicates with an electric power storage battery and receives a desired charge current value, and the power converter is further responsive to the desired charge current value to convert power from the AC port to DC at a DC output at a variable current not exceeding the desired charge current value for a DC load.

In some embodiments, the isolated DC-DC converter may further comprise a buck converter circuit for converting DC power from the opposed ends of the high voltage capacitor to a lower DC output voltage set by the charge voltage value.

In some embodiments, the isolated DC-DC converter may further comprise a boost converter circuit for converting DC power from the opposed ends of the high voltage capacitor to a higher DC output voltage set by the charge voltage value.

In some embodiments, the two intermediate low voltage power switches and the two terminal low voltage power switches are switched at a frequency above 10 kHz.

In some embodiments, the converter comprises a housing including a connector backplane having a plurality of module sockets and at least one module connected in the module socket, each of the modules comprising the rectifier circuit, the modules working in parallel to provide DC power to the load.

In some embodiments, the circuit of the multilevel converter may be a bidirectional rectifier/inverter circuit with two controllers. This embodiment includes an inductor connected in series with an AC port, a low-voltage capacitor, two high-voltage power switches connected between a first AC terminal and opposed ends of the high voltage capacitor, two intermediate low voltage power switches connected between the opposed end of the high-voltage capacitor and opposed ends of the low voltage capacitor, and two terminal low voltage power switches connected between the opposed ends of the low voltage capacitor and a second AC terminal; wherein a DC port can be connected to the opposed ends of the high voltage capacitor; the controller is a first controller for a rectifier mode having at least one sensor for sensing current and/or voltage in the bidirectional rectifier/inverter and connected to a gate input of the two high-voltage power switches, the two intermediate low voltage power switches and the two terminal low voltage power switches for causing the rectifier circuit to operate in a boost mode wherein a voltage of the high voltage capacitor is higher than a peak voltage of the AC port, and the two high-voltage power switches are controlled to switch on and off at a frequency of the AC port, and the two intermediate low voltage power switches and the two terminal low voltage power switches are switched with redundant switching states in response to a measurement of a voltage present at the low voltage capacitor so as to maintain the low voltage capacitor at a predetermined fraction of a desired voltage for the high voltage capacitor and to thus maintain the high voltage capacitor at a desired high voltage, with the rectifier circuit supplying the DC load and absorbing power as a five-level active rectifier with low harmonics on the AC port; and the power converter further comprises a second controller for an inverter mode connected to the two high-voltage power switches, the two intermediate low voltage power switches and the two terminal low voltage power switches and configured to generate and apply to the two high-voltage power switches, the two intermediate low voltage power switches and the two terminal low voltage power switches signal waveforms comprising a first control signal for causing the low voltage capacitor to be series connected with the DC port and the AC port and charged to a predetermined value proportional to a Voltage of the DC port, and a second control signal for causing the low voltage capacitor to be disconnected from the DC port and series connected with the AC port, thereby causing the low voltage capacitor to be discharged.

In some examples of the DC-DC converter, the first converter provides AC current having a frequency a frequency of above 400 Hz, and preferably up to about 4 kHz.

In some examples of the DC-DC converter, the first converter may have a switching frequency of 20 kHz.

In one other broad aspect, the present disclosure provides an isolated AC-DC converter comprising a first converter working in a rectifier mode receiving AC current and providing DC current, a second converter working in an inverter mode receiving the DC current from the first converter and providing AC current, a transformer receiving the AC current from the second converter having an input and output, the transformer providing electric isolation between the input and output, a third converter working in a rectifier mode receiving AC current from the transformer and providing DC current wherein at least one of the first, second and third converters is a multilevel converter. The multilevel converter comprises an AC port, at least one DC port, a power converter component connected to the AC and at least one DC ports converting power between the AC port and DC port at a variable voltage. The power converter component includes at least one high-voltage capacitor for storing power at a voltage boosted above a peak voltage of the AC port and a circuit. The circuit comprises an inductor connected in series with the AC port, a low-voltage capacitor, two diodes or high voltage switches connected between a first AC port terminal and opposed ends of the high voltage capacitor, two intermediate low voltage power switches connected between the opposed end of the high-voltage capacitor and opposed ends of the low voltage capacitor, two terminal low voltage power switches connected between the opposed ends of the low voltage capacitor and a second AC terminal, wherein the DC port can be connected to the opposed ends of the high voltage capacitor, and a controller having at least one sensor for sensing current and/or voltage in the circuit and connected to a gate input of the two intermediate low voltage power switches and the two terminal low voltage power switches.

In some embodiments, the controller may operate to cause the circuit to operate in a rectifier boost mode wherein a voltage of the high voltage capacitor is higher than a peak voltage of the AC port, and the two intermediate low voltage power switches and the two terminal low voltage power switches are switched with redundant switching states in response to a measurement of a voltage present at the low voltage capacitor so as to maintain the low voltage capacitor at a predetermined fraction of a desired voltage for the high voltage capacitor and to thus maintain the high voltage capacitor at a desired high voltage, with the circuit supplying a DC load and absorbing power as a five-level active rectifier with low harmonics on the AC port.

In some embodiments, the controller interface further communicates with an electric power storage battery and receives a desired charge current value, and the power converter is further responsive to the desired charge current value to convert power from the AC port to DC at a DC output at a variable current not exceeding the desired charge current value for a DC load.

In some embodiments, the multilevel converter further comprises a buck, a boost or a buck/boost converter circuit for converting DC power from the opposed ends of the high voltage capacitor to a lower DC output voltage set by the charge voltage value.

In some embodiments, the two intermediate low voltage power switches and the two terminal low voltage power switches are switched at a frequency above 10 kHz.

In some embodiments, the circuit may be a bidirectional rectifier/inverter circuit comprising an inductor connected in series with an AC port, a low-voltage capacitor, two high-voltage power switches connected between a first AC terminal and opposed ends of the high voltage capacitor, two intermediate low voltage power switches connected between the opposed end of the high-voltage capacitor and opposed ends of the low voltage capacitor, and two terminal low voltage power switches connected between the opposed ends of the low voltage capacitor and a second AC terminal; wherein a DC port can be connected to the opposed ends of the high voltage capacitor, the controller is a first controller for a rectifier mode having at least one sensor for sensing current and/or voltage in the bidirectional rectifier/inverter and connected to a gate input of the two high-voltage power switches, the two intermediate low voltage power switches and the two terminal low voltage power switches for causing the rectifier circuit to operate in a boost mode wherein a voltage of the high voltage capacitor is higher than a peak voltage of the AC port, and the two high-voltage power switches are controlled to switch on and off at a frequency of the AC port, and the two intermediate low voltage power switches and the two terminal low voltage power switches are switched with redundant switching states in response to a measurement of a voltage present at the low voltage capacitor so as to maintain the low voltage capacitor at a predetermined fraction of a desired voltage for the high voltage capacitor and to thus maintain the high voltage capacitor at a desired high voltage, with the rectifier circuit supplying the DC load and absorbing power as a five-level active rectifier with low harmonics on the AC port; and the power converter further comprises a second controller for an inverter mode connected to the two high-voltage power switches, the two intermediate low voltage power switches and the two terminal low voltage power switches and configured to generate and apply to the two high-voltage power switches, the two intermediate low voltage power switches and the two terminal low voltage power switches signal waveforms comprising a first control signal for causing the low voltage capacitor to be series connected with the DC port and the AC port and charged to a predetermined value proportional to a Voltage of the DC port, and a second control signal for causing the low voltage capacitor to be disconnected from the DC port and series connected with the AC port, thereby causing the low voltage capacitor to be discharged.

In some embodiments of the isolated AC-DC converter, the first converter may have a diode bridge for unidirectional application. In some embodiments of the isolated AC-DC converter, the first converter has a diode bridge and a conventional DC-DC buck or boost converter to provide power factor correction.

In some embodiments, of the isolated AC-DC converter, the first converter has an active Pulse Width Modulation rectifier to provide power factor correction.

The disclosed isolated AC-DC converter and DC-DC converter may be used as on-board isolated converters in electric, hybrid or any other kind of vehicle needing on-board isolation converters.

In one aspect, the present disclosure provides an isolated AC-DC converter comprising a converter working in an inverter mode receiving DC current and providing AC current a transformer receiving the AC current having an input and output, the transformer providing electric isolation between the input and output. The converter may be a multilevel converter as explained herein.

In some examples of the AC-DC converter, the second converter provides AC current having a frequency a frequency of above 400 Hz, and preferably up to about 4 kHz.

In some examples of the AC-DC converter, the second converter has a switching frequency of 20 kHz.

In one broad aspect, the present disclosure provides method for providing electrical isolation using an isolated converter. The method comprises providing the isolated converter with a first DC current, selecting a first output frequency for converting the first DC current to a first AC current, converting the first DC current to the first AC current at the first output frequency using a first conversion circuit, providing the first AC current to a transformer having a size and receiving a second AC output current having electrical isolation from the first AC current, wherein the size of the transformer providing isolation is determined based on said first output frequency of the first AC current.

In some examples of the method, the providing the isolated converter with the first DC current comprises receiving a third AC current having a third frequency lower than the first frequency of the first AC current and converting the third AC current to the first DC current using a second converter circuit.

In some examples of the method, at least one of the first converter circuit and the second converter circuit is a multi-level converter circuit. In some examples of the method, the multi-level converter circuit is a five-level active rectifier.

In some examples of the method, the converting the first DC current to the first AC current at the first output frequency using the first conversion circuit comprises providing a multilevel voltage AC waveform with harmonic suppression.

In some examples, the method may further comprise converting the second AC current to Second DC current using a third converter circuit.

Provided are systems, methods and more broadly technology as described herein and claimed below.

BRIEF DESCRIPTION OF THE DRAWINGS

The present examples will be better understood with reference to the appended illustrations which are as follows.

DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Figure 1A:
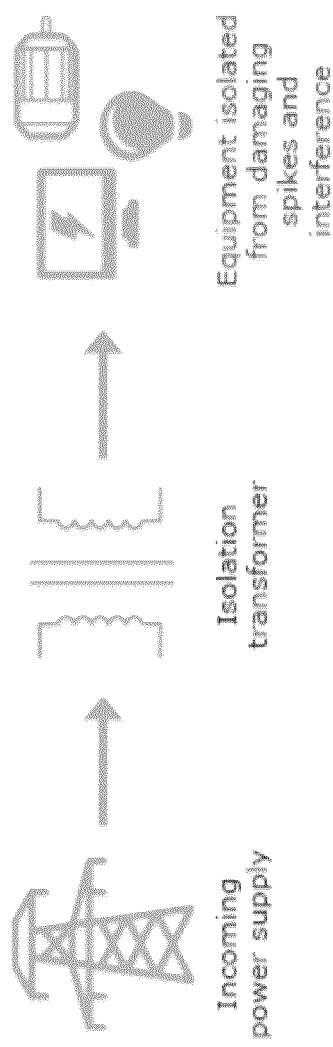
FIG. 1A shows an illustration drawing of what a typical isolation transformer separates the equipment to be protected against surge and other abnormalities from a power supply.

FIG. 1A shows a typical example of an isolated converter and how it can prevent the electrical equipment from being damaged by a voltage spike power surge. The isolation between two sides of the isolation transformer means that the incoming power supply does not have direct connection and common ground with the requirement isolated. This is even more important in case of EV vehicles. Having isolation both provide safety for the user, which is required by most standards for charging EV, and can result in protection of the electrical equipment and the battery of the EV in case of a surge in the power network.

Figure 1B:
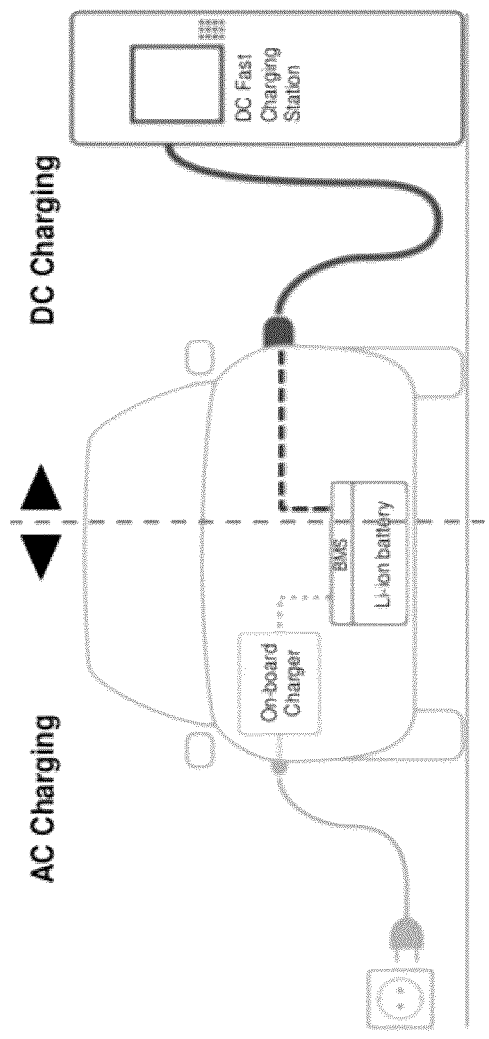
FIG. 1B shows a schematic illustration of an example of an EV and how the DC and AC charging work.

FIG. 1B illustrates an electric vehicle or other kind of plug in vehicles and how the DC and AC charging work. As illustrated in AC charging an isolated conversion is required for safety purposes. The common isolated conversion units are generally non-efficient. Use of 5-level Packed U-Cell topology working in a bidirectional mode provides an active converter with power factor correction. By using multiple conversion circuits, it would be possible to achieve a more efficient isolated converter as disclosed herein.

FIG. 1.C illustrates the physical context of an embodiment in which split single phase main power is delivered from a utility pole top transformer, as is the most common type of electrical power delivery in North America. The transformer receives typically 14.4 kV or 25 kV single-phase power from a distribution line and the transformer can handle approximately 50 kVA to 167 kVA of power delivered as split phase 240 VAC to a small number of homes or electrical entries. Each electrical entry is typically configured to handle between 100 A to 200 A of power at 240 VAC, namely about 24 kVA to 48 kVA (the common assumption is that 1 kVA is equivalent to 1 kW). As shown, the conversion apparatus or device connects to the network via the AC connection and can connect to multiple vehicles and/or solar panel. This could be achieved thanks to bidirectional (rectifier/inverter) nature of the apparatus which provides it by the capability of receiving AC or DC power from one port and providing AC or DC from other ports.

It will be appreciated by those skilled in the art that despite the single phase entry illustration, the embodiments of present disclosure are not restricted to split single phase 240 VAC power systems and that any of the embodiments disclosed herein may be adapted to work with different power networks delivering AC voltage.

The electrical entry typically comprises a usage meter, the main breaker having a rating corresponding to the total permitted load (e.g., 100 A or 200 A), and a panel having circuit breakers for each household circuit which may be supplied with 240 VAC power or 120 VAC power from the split phase 240 VAC input. While most circuit breakers have capacities of between 15 A to 30 A, some can be lower (namely 10 A) and some may be larger, such as 40 A, for large appliances. In some countries, electrical entries have a lower capacity, such as 40 A to 60 A, and in countries with 240 VAC in all household circuits, the power is not a split phase, but regular single phase 240 VAC (the voltage level used can vary from about 100 V to 250 V).

Figure 1C:
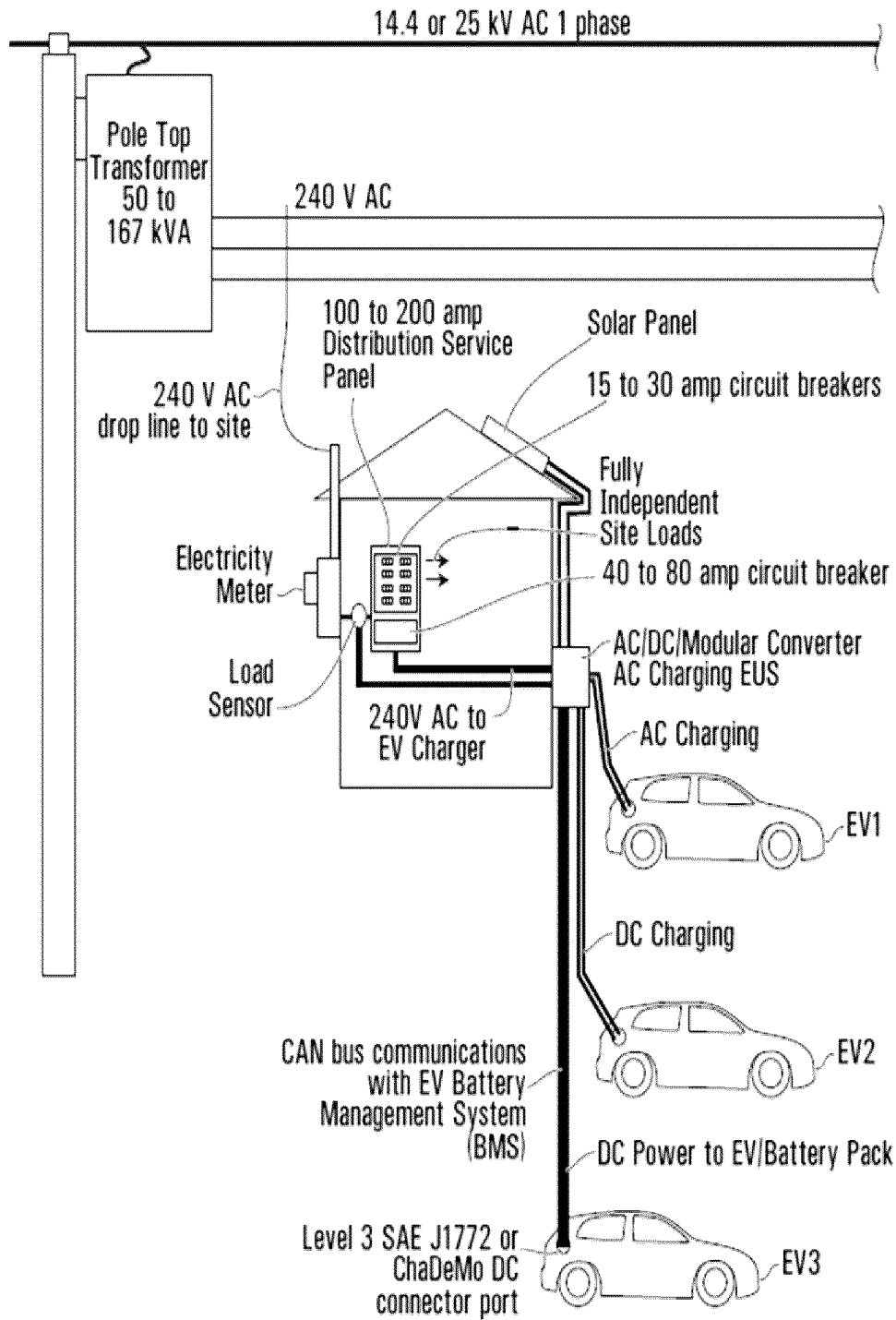
FIG. 1C is a schematic illustration of the physical installation of a home EV charging system including a pole-top transformer, residential electrical entry with a load sensor and a main circuit breaker panel, a 240 V AC power line between the panel and an apparatus, two cable connection extending between the apparatus and an electric vehicle (EV) with CAN bus connection between the EV and the apparatus and a solar panel connection.
Figure 1D:
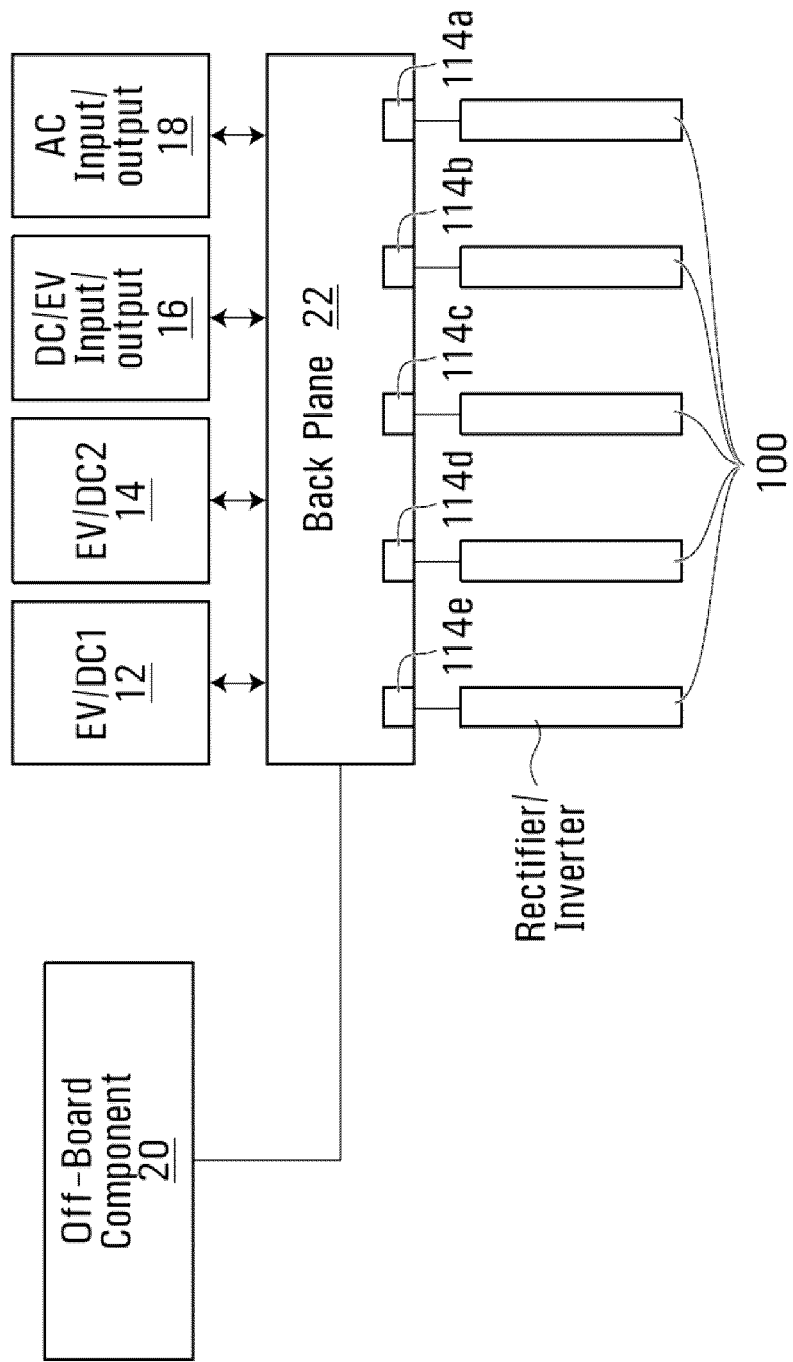
FIG. 1D is a block diagram showing a converter with multiple DC and AC ports and off-board component panel in accordance to one embodiment of the present disclosure.

As illustrated in FIG. 1C, the conversion apparatus/converter may be connected to a circuit breaker of the main panel through a breaker having a larger current rating, such as 40 A to 80 A, although the apparatus disclosed can consume over 100 A if desired. The need for a circuit breaker specific to the apparatus is determined by electrical codes. The cable connecting the apparatus to the panel is rated for such high current. The connection to the electrical panel can be a direct fixed wiring, or a high-voltage socket can be installed and connected to the electrical panel such that the apparatus connects to the panel using a cable and plug, for example, those that are similar to those used for appliances like ovens or clothes dryers. The apparatus is shown to be connected to a single load sensor that senses the load drawn by the whole panel including the apparatus. The apparatus cable can be a conventional apparatus cable and plug, as is known in the art. Furthermore, as illustrated in FIG. 1C, the converter may connect to a solar panel, as well as one or more electric vehicle. Providing electrical isolation between the solar panel and the house electrical wiring is another benefit of the converter providing protection against the risk of lightning.

FIG. 1.D is a block diagram showing an exemplary power conversion apparatus 10 with an AC port 18, multiple DC and EV/DC ports 12 and 14, DC/EV input port 16, and an off-board component panel 20. As illustrated in FIG. 1D, the ports 12 and 14 may connect to EV1 and EV2 and DC/EV port 16 may connect to solar panels to use the DC energy produced by the panels.

In some embodiments, the converter may be adapted to receive DC current from a first port such as EV/DC port 12 of the plurality of DC ports and deliver variable voltage to a second port such as the EV/DC port 14. This may be achieved by using a plurality of switches that may be located on a backplane 22 on conversion circuit module 100 or on a separate switching module that may connect to the backplane or directly to the conversion circuit modules 100.

It will be appreciated by those skilled in the art that, although module 100 is shown to be a bidirectional conversion module, any other type of modules such as rectifier, inverters, DC-DC, buck boost module and surge protector module, depending on the need, may be used in the converter device.

Referring back to FIG. 1D, the converter modules 100 may connect to the backplane 22 using connector 114 (here shown as connectors 114a, 114b, 114c, 114d, 114e each connecting to one module 100). The converter 10 may also benefit from an off-board component board 20 which in this embodiment is used for purposes of housing the inductors.

Figure 2:
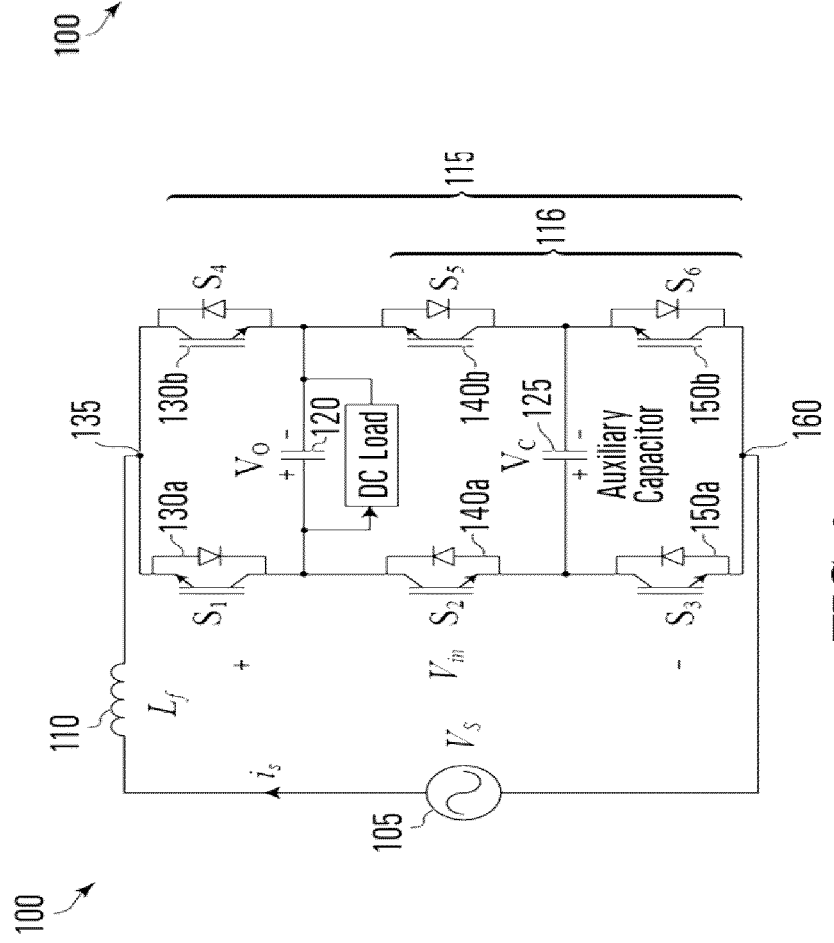
FIG. 2 shows a circuit diagram of a converter with a 5-level topology circuit working in a rectifier mode, according to a particular example of implementation.

FIG. 2 shows the details of an example of the type conversion circuit modules 100 that may be used in the converter according to a particular example of implementation. The conversion circuit 100 working in the rectifier mode may comprise an AC input 105, an inductive filter 110 connected in series with the AC input 105, and a 5-level topology circuit 115.

In some examples, the inductive filter 110 in this non-limiting example may be a 2.5 mH inductor. Conveniently the present design allows for a small geometry of the overall power conversion circuit 100, due in part to the small size of the inductive filter 110. The inductive filter 110 can vary according to design as chosen based on the application, power rating, utility voltage harmonics, switching frequency, etc. Although the simplest such filter is a single inductor, in an alternative embodiment the inductive filter 110 may include a combination of inductor(s) and capacitor (s), e.g., an (e.g., 2 mH) inductor connected to a capacitor (e.g., 30 μF), itself connected to ground. The choice of the filter has an impact on the overall size of the design and losses, with a bigger filter increasing the size of the overall design and generally incurring more losses.

The 5-level circuit may comprise a high-voltage capacitor 120, at least one low-voltage capacitor 125, two high-voltage power switches 130a, 130b connected between a first terminal 135 and respective opposed ends 145a, 145b of the high-voltage capacitor 120, two intermediate low-voltage power switches 140a, 140b, each connected between respective ones of the two opposed end 145a, 145b of the high-voltage capacitor 120 and respective opposed ends 155a, 155b of the low-voltage capacitor 125, and two terminal low-voltage plower switches 150a, 150b each connected between a second input terminal 160 and respective ones of the opposed ends 155a, 155b of the low-voltage capacitor 125. Hen working in rectifier mode the high-voltage power switches 130a, 130b may be replaced by two diodes without affecting the way the converter circuit works.

Figure 3:
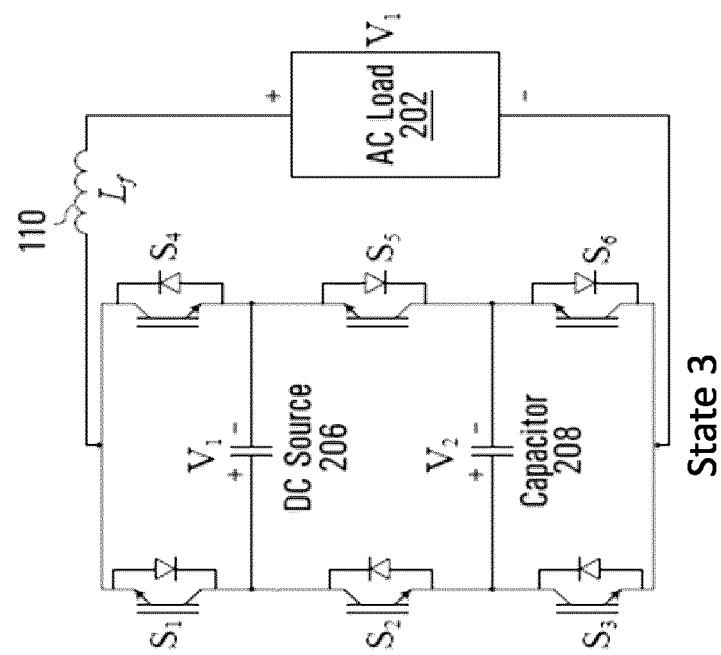
FIG. 3 shows a circuit diagram of a battery apparatus converter with a 5-level topology circuit working in an inverter mode, in accordance with one embodiment.

In Some examples, the power conversion module 100 may use the power operate in bidirectional or inverter only states. That means that 5-level circuit must have the high-voltage power switches 130a, 130b, and cannot replace them with two diodes, to convert voltage/current from AC to DC in a rectifier mode as shown in FIG. 2 or from DC to AC in an inverter mode as shown in FIG. 3 with an AC load 202 and a DC source 206

The details of an example of the converter module (module 100), how it works, and its switching details has been disclosed by the applicant in the international PCT patent application having serial number PCT/CA2018/05129 with the Publication Number WO/2019/071359.

As described herein, in different embodiments the power conversion circuit 100 may have off-board or on-board components such as inductors and switching elements. Furthermore, the power conversion circuit 100 may have a buck/boost circuit integrated in it.

Figure 4:
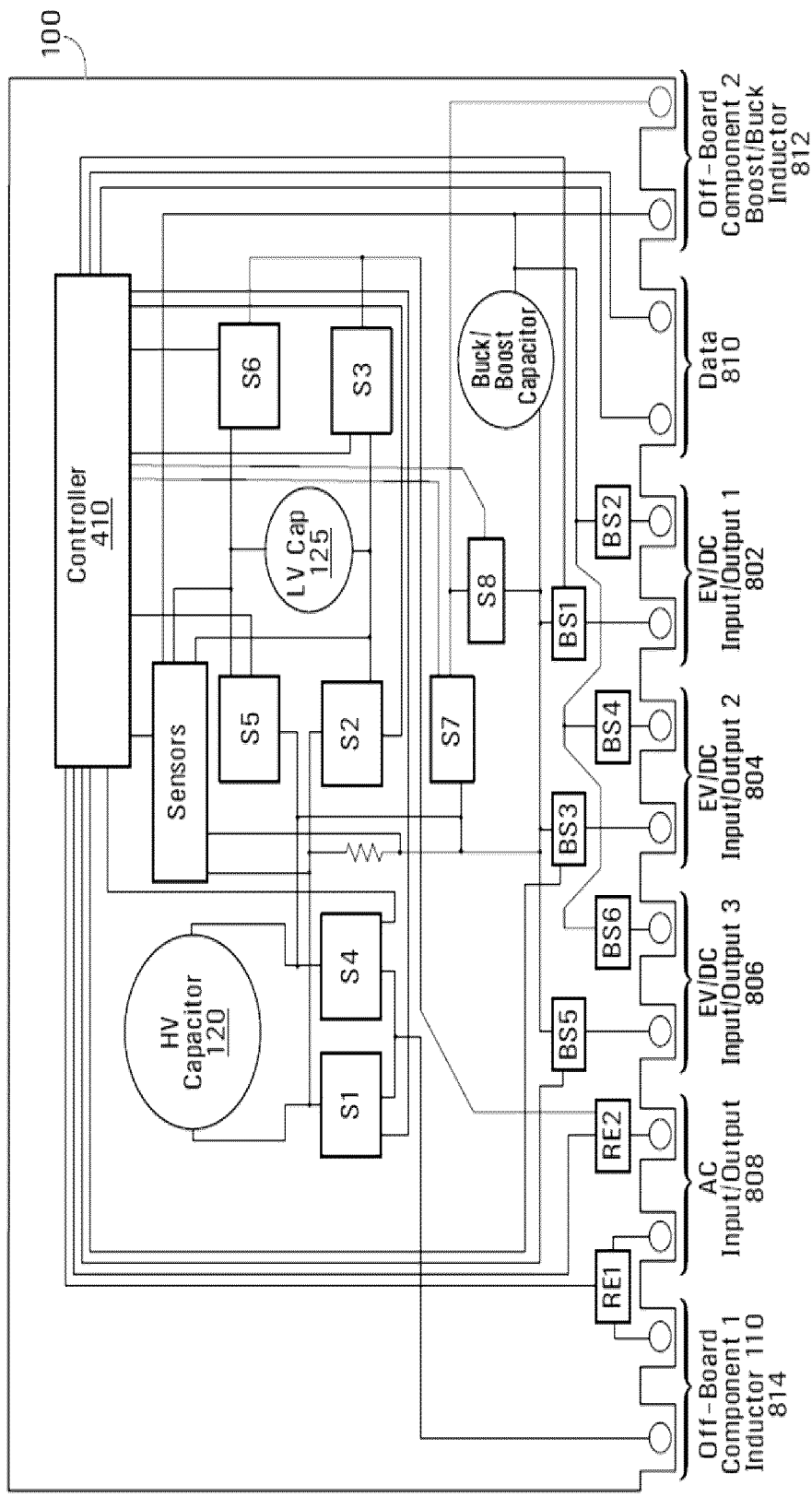
FIG. 4 is a schematic illustration of a power converter module with integrated switching capability and multiple DC outputs in accordance with one embodiment.

As illustrated in FIG. 4, in one embodiment, the power converter module 100 has an integrated switching capability. Bidirectional switches BS1, BS2, BS3, BS4, BS5, and BS6 along with relays RE1 and RE2 allow the power converter module 100 to perform the switching between multiple DC ports 802, 804 and 806 and the AC port 808 on-board without needing any external switching. The ports 812 and 814 are used to connect the power converter module 100 to its off-board components in this example being the inductive filter/inductor 110 for port 814 and a buck/boost inductor 816.

Figure 5:
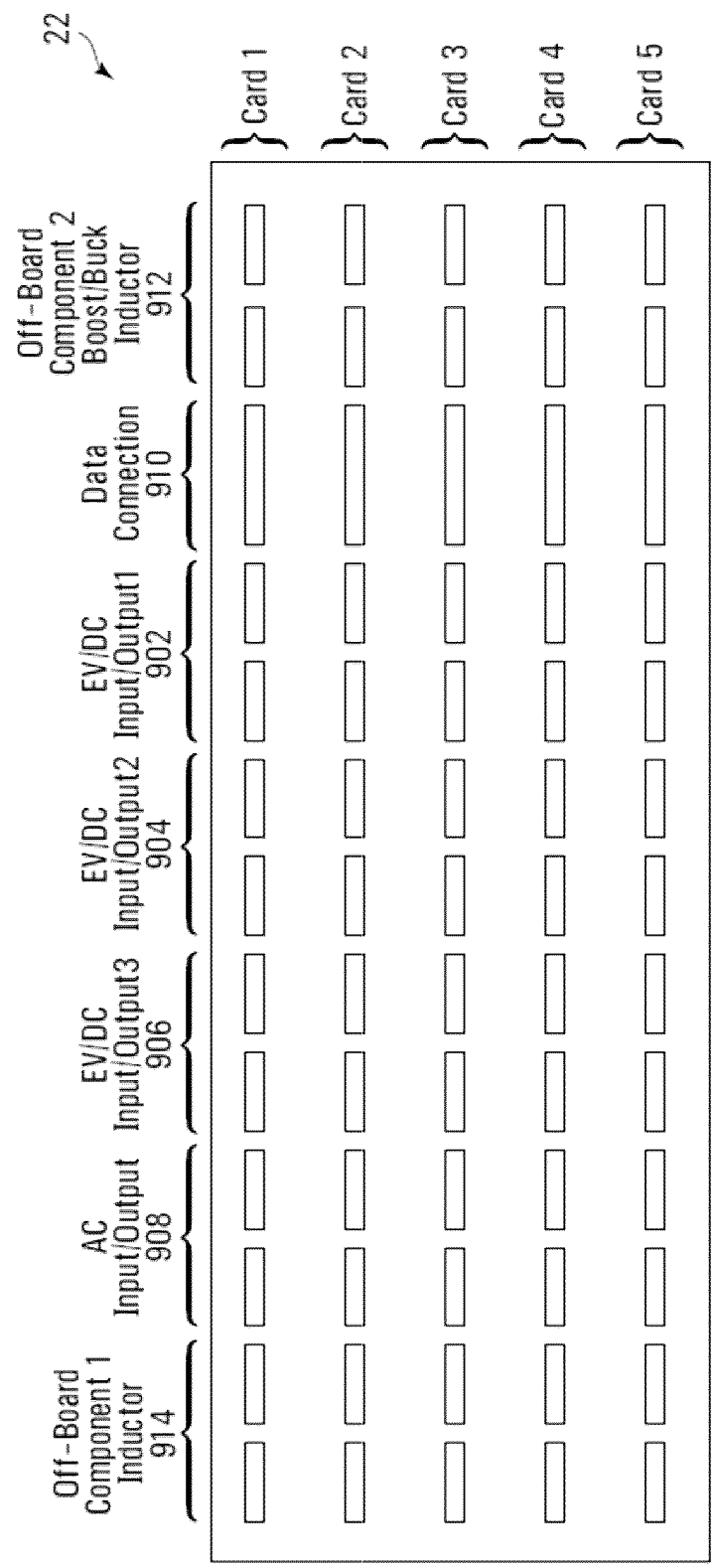
FIG. 5 is a schematic illustration of a backplane working with the power converter module shown in FIG. 3 according to one embodiment.

FIG. 5 shows an example of a backplane 22 that may be used by the power converter module 100 shown in FIG. 4. As explained, in this embodiment, all the switching can be done on-board the module and the backplane may be only connecting similar ports of the cards 1 to 5 to each other and to the power conversion apparatus ports. There are five series of connectors for cards 1 to 5 and each series of connectors has connectors 912, 910, 902, 904, 906, 908 and 914 which receives respectively ports 812, 810, 802, 804, 806, 808 and 814 of the power converter module 100. In one embodiment, all similar ports of different cards may be connected to each other. For example, all ports 902 of cards 1 to 5 may be connected to each other.

It will be appreciated by those skilled in the art that, although in this embodiment necessary switching exists on module 100 but the backplane 22, in some embodiments, may benefit from additional switching to connect ports to each other in a different order and combination.

Figure 6:
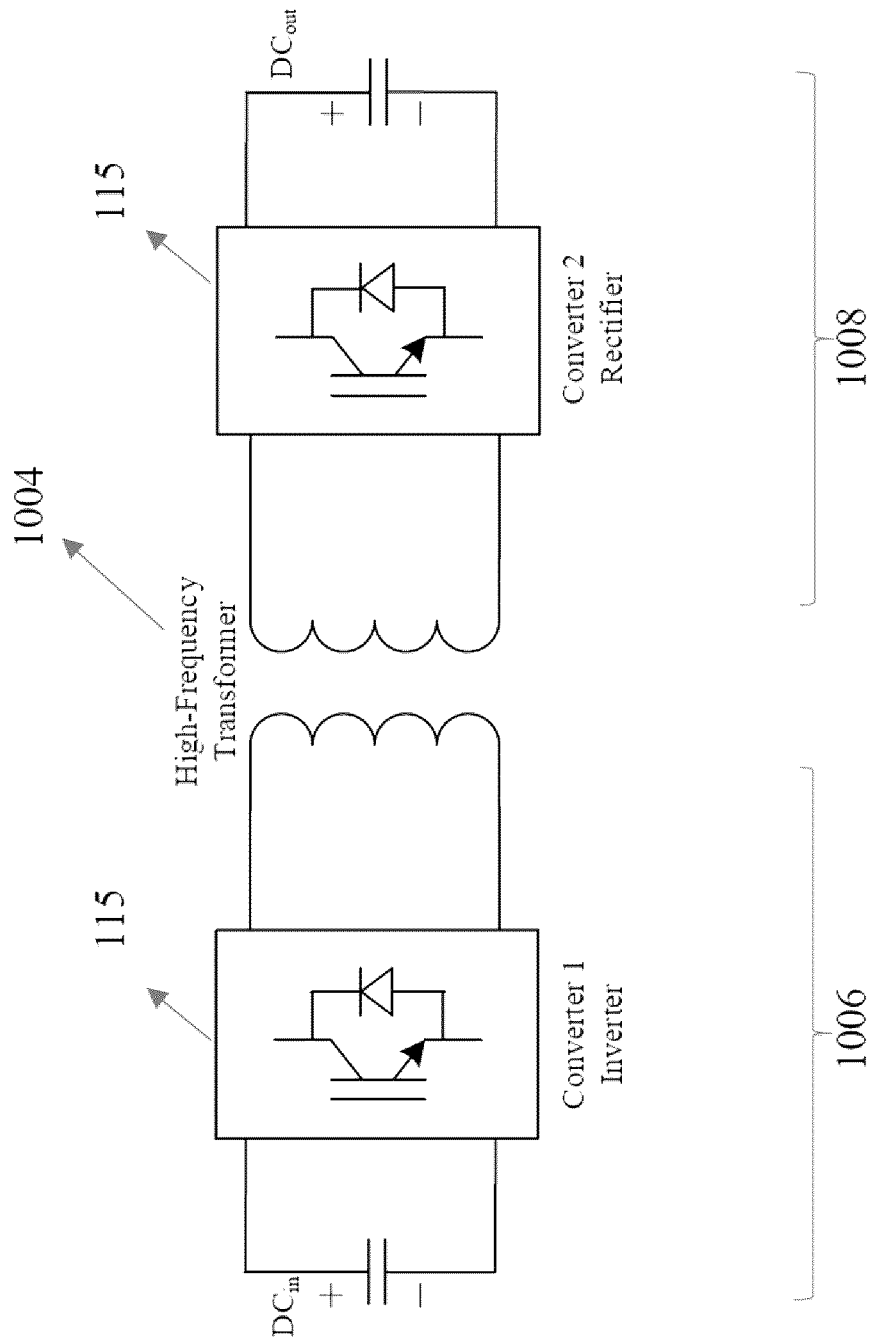
FIG. 6 shows a schematic circuit diagram of an isolated DC-DC converter according to one embodiment of the present invention.

Referring to FIG. 6 illustrating an isolated DC-DC converter 1002 including a first converter 1 having the circuit 115 on the side 1006 working in an inverter mode receiving DC current and providing AC current. The converter inverter receives DC and converts it to DC current to be used by a transformer 1004. In some embodiments, the transformer may work in a higher frequency. The higher frequency may result in reduction for the size of the transformer that might be beneficial especially when the isolated converter is used on-board a vehicle.

In one embodiment, the Converter 1 may work as an inverter to generate an AC voltage waveform at high frequency from the DC current that it receives. Such high-frequency AC voltage can be from about 400 Hz and up to about 4 kHz. Using the multi-level converter having power switches switching at a frequency of at least about 5 times greater, a good sinusoidal approximation AC waveform can be generated for efficient power transfer through the isolation transformer. It can also be stepped up or down using a small transformer, or the voltage can be the same. The high frequency would allow choosing a transformer with a smaller size than what is used in standard AC power supply, for example 50 Hz or 60 Hz current.

Finally, the high-frequency AC voltage may be rectified at boost mode with Converter 2 working as a rectifier. In some embodiments, the Converter 2 may be replaced by a diode bridge in unidirectional applications.

In this way, an electrical fault on the AC input side to ground will not feed any voltage to the output side of the transformer. In an electric vehicle, a fault to ground on the AC side could expose the vehicle chassis to the input AC voltage. Since the vehicle is insulated by its tires, a person could receive a dangerous electrical shock by touching the vehicle body and thus providing a path to ground.

The transformer receives the AC current and has an AC output. While the transformer 1004 may contribute to other roles in the system, its main duty is to provide electric isolation between the circuitry on its sides 1006 and 1008, this is especially beneficial and in times required for safety purposes such as in an EV or a plug-in hybrid vehicle.

The second converter 2 has a similar circuit 115 on the side 1008 but it works in a rectifier mode as described in this application. It receives AC current from the transformer 1004 and convert it to DC current.

Furthermore, it will be appreciated by those skilled in the art the backplane referred to herein does not necessarily refer to a socket type backplane and can be any kind of connector board. For example, all cards and ports can be connected by wiring and connectors to the backplane.

Moreover, backplane does not necessarily have to be one piece and can perform the above-mentioned function despite being made of separate parts in the connector. This schematic illustration only refers to an example and the principle on which the different types of converter cards or module may connect to each other.

Figure 7:
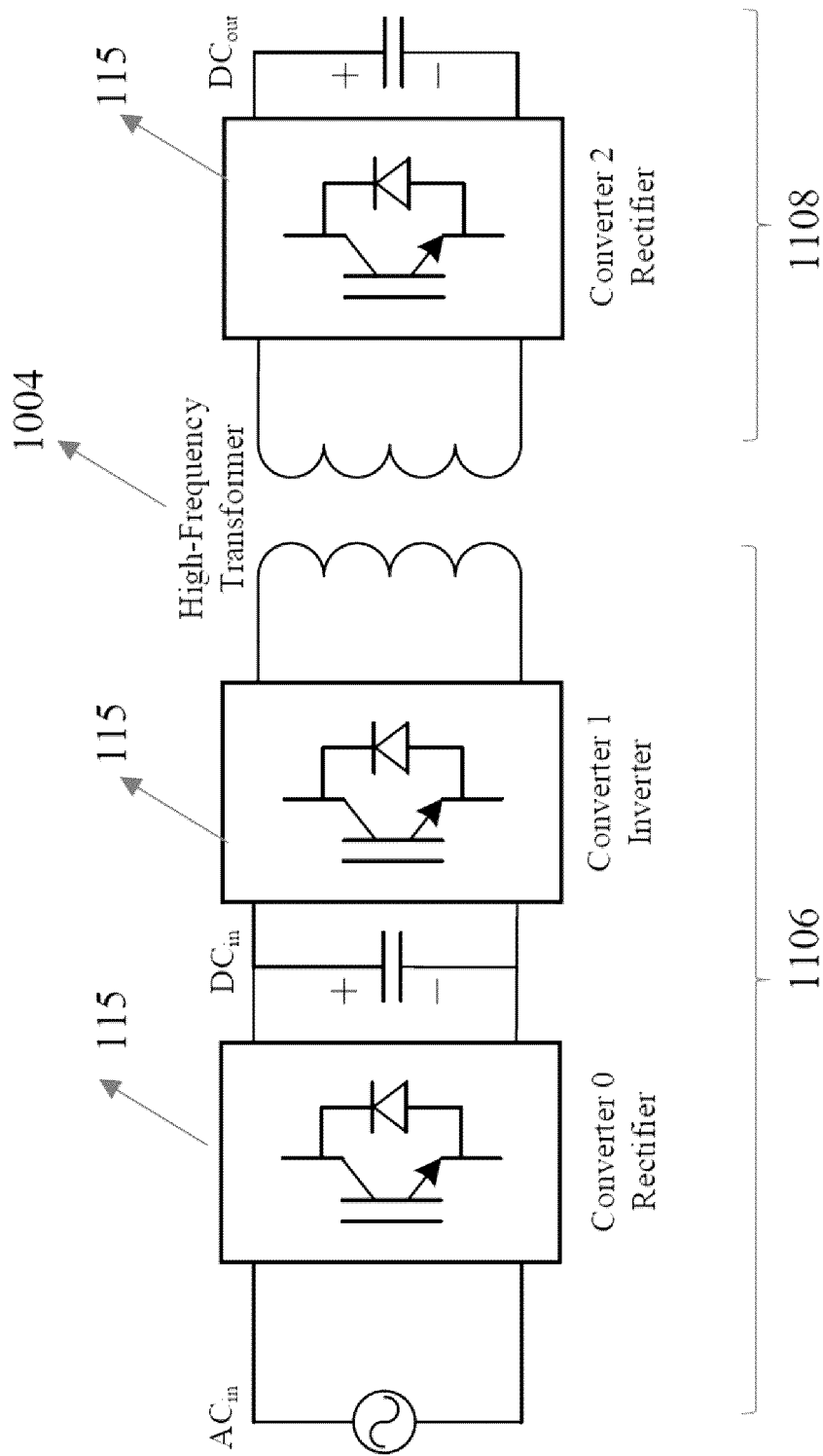
FIG. 7 shows a schematic circuit diagram of an isolated AC-DC converter according to one embodiment of the present invention.

FIG. 7 shows AC-DC isolated converter 1102 having three converters 0, 1 and 2 with three circuits 115. Converter 0 converts the AC current to DC before delivering it converter 1 which functions just like converter 1 explained in FIG. 6. The converters 0 and 1 may be on one side 1106 of the transformer 1004 and converters 2 is on the other side of transformer 1004. The transformer 1004 which provides electrical isolation between two sides 1106 and 1008.

As illustrated in FIG. 7, the AC voltage (AC in) is first converted into DC (DC in) using the Converter 0 working as a rectifier. The rest of the process may be similar to what was explained for DC-DC converter including the galvanic isolation provided through the high-frequency transformer 1004.

The converter 0 may be any kind of converter known in the art including a diode bridge for unidirectional application, a diode bridge and a conventional DC-DC buck or boost converter to provide power factor correction (known as PFC stage), an active PWM rectifier to provide PFC stage.

It can be concluded that 3 stages are involved in an AC-DC isolated converter working as an on-board battery charger for EVs. Due to high efficiency and performance of 5-Level topology converter, it can replace each stage of the AC-DC isolated on-board charger to have isolated PUC5 Converter whether bidirectional or unidirectional.

In some embodiments, the isolated AC-DC converter may be bidirectional providing AC power from a DC source. In one example, a battery of an EV can be used as a DC source at the DC port to provide AC power at the AC port. This would be beneficial to provide Vehicle to House (V to H) power. In this embodiment, it would be preferable if all the converters 0, 1 and 2 are 5-level multilayer converters as disclosed herein.

In some embodiments, the isolated DC-DC converter may further comprise a buck converter circuit for converting DC power from the opposed ends of the high voltage capacitor to a lower DC output voltage set by the charge voltage value.

In some embodiments, the isolated DC-DC or AC-DC converters may further comprise a boost converter circuit for converting DC power from the opposed ends of the high voltage capacitor to a higher DC output voltage set by the charge voltage value. The buck/boost converter may be integrated in any of the converters 0, 1 and 2.

In some embodiments, the two intermediate low voltage power switches and the two terminal low voltage power switches are switched at a frequency above 10 kHz and close to 20 kHz or more due to nature and size of the transformer.

In some embodiments of the isolated AC-DC converter 1102, the first converter 0 may have a diode bridge for unidirectional application. In some embodiments of the isolated AC-DC converter, the first converter 0 has a diode bridge and a conventional DC-DC buck or boost converter to provide power factor correction.

In some embodiments of the isolated AC-DC converter 1102, the first converter 0 has an active Pulse Width Modulation rectifier to provide power factor correction.

The disclosed isolated AC-DC converter 1102 and DC-DC 1002 converter may be used as on-board isolated converters in electric, hybrid or any other kind of vehicle needing on-board isolation converters.

In one aspect, the present disclosure provides an isolated AC-DC converter comprising a converter working in an inverter mode receiving DC current and providing AC current a transformer receiving the AC current having an input and output, the transformer providing electric isolation between the input and output. The converter may be a multilevel converter as explained herein.

It will be appreciated by those skilled in the art that the converter 1 or 2 may have other components or circuitry in addition to circuit 115 including multiple circuits working in parallel, buck/boost circuits, interfaces for communication and other possible modules and components as known in the art.

Furthermore, in addition to 5-level circuitry disclosed herein any other multilevel converter topology may use alternatively in accordance with making isolated DC-DC and AC-DC converters.

It will be appreciated by those skilled in the art that any one of the embodiments disclosed herein may be used as an external converter for household working with one or more EVs or alternatively be used as an internal charging mechanism of the EV providing all the above advantages as an integrated part of the EV.

Figure 8:
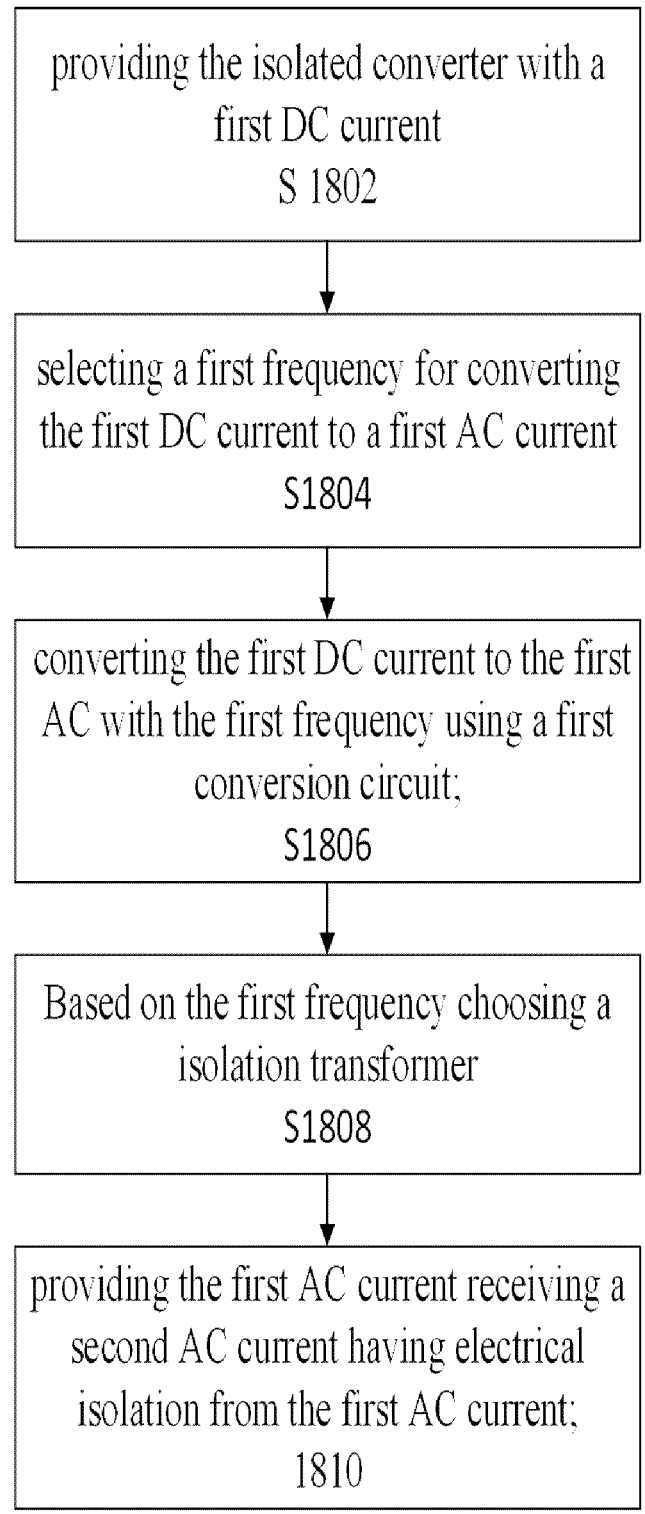
FIG. 8 shows a flowchart of an exemplary method as disclosed in accordance with one embodiment of the present invention.

Referring to FIG. 8 now, different steps of an exemplary method for providing electrical isolation is illustrated. Box S1802 provides the isolated converter with a DC current. In some embodiments, as explained above, the DC may be received from an outside source, for example a battery. In some other embodiments, the converter may receive AC current at a lower frequency and convert it to DC. Box S1802 shows providing and selecting the frequency in which the transformer may work. The frequency is typically chosen during the designing of the converter to allow choosing the size of the transformer as indicated in BOX 1808. As shown in Box 1808 the DC input is transformed to AC voltage in the chosen frequency before entering the transformer. It will be appreciated by those skilled in the art that the desirable output voltage from the transformer, along with other factors, may affect the size of the transformer as well. The transformer then provides an AC output current that may have a different or same voltage as the input voltage, depending on the specification of the transformer. By doing this, the AC output of the transformer has electrical isolation from the input and therefore provides safety for the equipment and the users.

In some examples, the AC output of the transformer may again go through another converter to reduce its frequency for daily use or converted to DC voltage.

In some examples, it may be more efficient to use multilevel converters at one or more of the stages. An example of an efficient converter to be used by this converter is a five-level active converter the details of which has been disclosed by the applicant in the international PCT patent application having serial number PCT/CA2018/051291 and publication number WO/2019/071359, as well as in US PG-Pub US2020/0070672 published Mar. 5, 2020, the content of which is hereby incorporated by reference.

It will be appreciated by those skilled in the art that any type of alternating signal (not a DC one), like square wave, may provide a reduction in size of the transformer by increasing the frequency of the transformer's AC input waveform. For example, the frequency of AC input waveform to the transformer can have direct relation to the power rating of the transformer and consequently to the size of the transformer.

It will be appreciated by those skilled in the art that the transformer core should also allow the transfer the amount of power (KVA).

In some examples, in order to provide a high frequency voltage waveform a converter working in an inverter mode may need to work at a higher switching frequency. In some examples, the switching frequency may need to be five times the output frequency of the converter to modulate properly. For example, in some embodiments, a switching frequency of 20 khz may be required to get an output frequency of 4 kHz from the converter which will be received by the transformer.

Therefore, the controller of the converter may have the switches to work at higher frequency to achieve that goal of higher output frequency and hence, the reduced size transformer.

In some examples, the following equation relates the KVA rating of the transformer and the dimensions of the transformer for a single-phase transformer:

KVA Rating=2.22*frequency*magnetic flux density*window space factor*Area of the window*cross-sectional area of the limb x current density*10^(−3)

Figure 9:
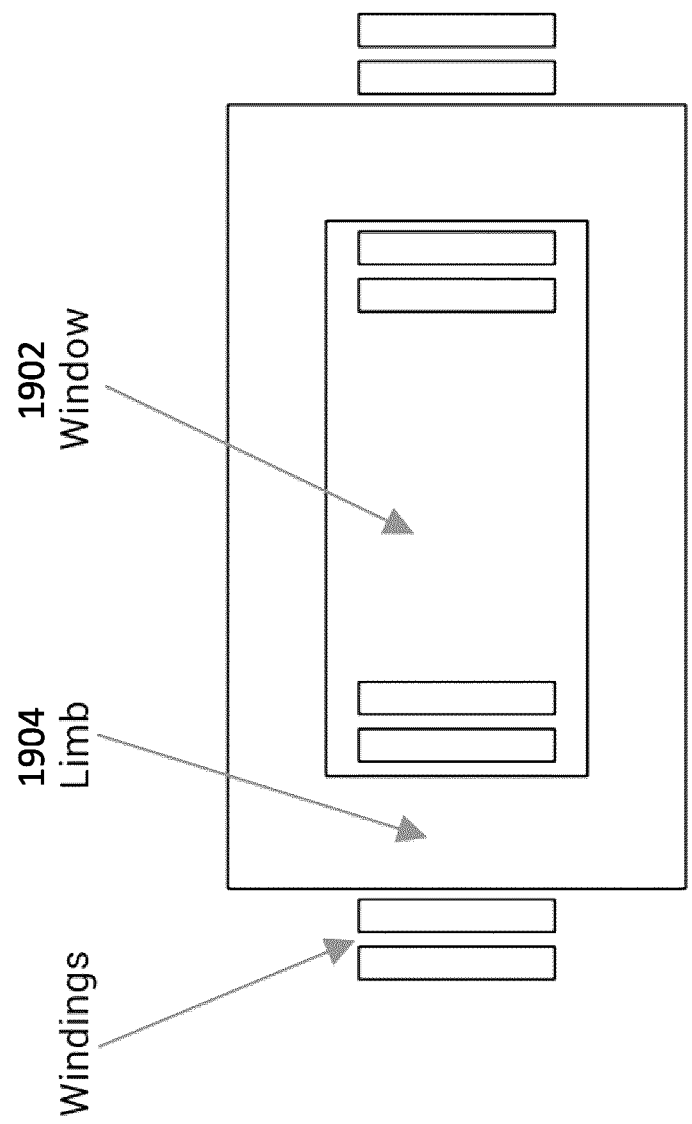
FIG. 9 is schematic cross-sectional view of a transformer in accordance with one embodiment of the present invention.

As illustrated in FIG. 9, in some examples, the area of the window 1902 and cross-sectional area of the limb 1904 are the main dimensions of a transformer; the product of which is directly proportional to the size and weight of the transformer. Larger this product, bigger and heavier is the transformer. In the output equation, the flux density depends on the type of material used to construct the transformer core; the current density depends on the type of cooling provided; and the window space factor is a constant. Therefore, the KVA rating may be considered directly proportional to the product of frequency, area of the window and cross-sectional area of the limb. Or more concisely, the KVA rating may be directly proportional to the product of frequency and the size of the transformer.

For a given transformer rating, as the frequency increases, the product of window area and cross-sectional area of the limb decreases, which means the size of the transformer core and the amount of iron required for the core decreases. Therefore, as the frequency increases, the transformer becomes lighter and smaller in size.

In some embodiments, the multilevel inverter (or converter working in inverter mode) may help increase the efficiency and provide more harmonic suppression by producing a multilevel voltage waveform for the primary of the transformer and reducing the harmonic losses and voltage/current ripple of the transformer.

In one embodiment, using a five-level active inverter provides a higher efficiency and harmonic suppression. Using such inverter may also reduce the size of other passive filters (L and C) in the circuit which is beneficial and provides a smaller isolated converter. An example of such inverter has been disclosed by the applicant in the international PCT patent application having serial number PCT/CA2018/051291 and publication number WO/2019/071359.

Although the above description has been provided with reference to a specific example, this was for the purpose of illustrating, not limiting, the invention.

What is claimed is:

1. An isolated DC-DC converter comprising:
    a first converter working in an inverter mode receiving DC current and providing AC current;
    a transformer receiving said AC current having an input and output, said transformer providing electric isolation between said input and output;
    a second converter working in a rectifier mode receiving AC current from said transformer and providing DC current;
    wherein at least one of said first and second converters is a multilevel converter comprising:
    an AC port;
    at least one DC port;
    a power converter component connected to said AC and at least one DC port converting power between said AC port and at least one DC port at a variable voltage, said power converter component comprising:
        at least one high voltage capacitor for storing power at a voltage boosted above
        a peak voltage of said AC port;
        a circuit comprising:
            an inductor connected in series with said AC port,
            a low voltage capacitor,
            one of:
                two diodes connected between a first AC port terminal and opposed ends of said high voltage capacitor; and
                two high voltage switches connected between a first AC port terminal and opposed ends of said high voltage capacitor,
            two intermediate low voltage power switches connected between said opposed ends of said high voltage capacitor and opposed ends of said low voltage capacitor, and
            two terminal low voltage power switches connected between said opposed ends of said low voltage capacitor and a second AC terminal,
            wherein said DC port can be connected to said opposed ends of said high voltage capacitor; and
        a controller having at least one sensor for sensing current and/or voltage in said circuit and connected to a gate input of said two intermediate low voltage power switches and said two terminal low voltage power switches.

2. The isolated DC-DC converter as defined in claim 1, wherein said controller is operative for causing said circuit to operate in a rectifier boost mode wherein a voltage of said high voltage capacitor is higher than a peak voltage of said AC port, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said circuit supplying a DC load and absorbing power as a five-level active rectifier with low harmonics on said AC port.

3. The isolated DC-DC converter as defined in claim 1, wherein said controller interface further communicates with an electric power storage battery and receives a desired charge current value, and said power converter is further responsive to said desired charge current value to convert power from said AC port to DC at a DC output at a variable current not exceeding said desired charge current value for a DC load.

4. The isolated DC-DC converter as defined in claim 1, further comprising a buck converter circuit for converting DC power from said opposed ends of said high voltage capacitor to a lower DC output voltage set by said charge voltage value.

5. The isolated DC-DC converter as defined in claim 1, further comprising a boost converter circuit for converting DC power from said opposed ends of said high voltage capacitor to a higher DC output voltage set by said charge voltage value.

6. The isolated DC-DC converter as defined in claim 1, wherein said two intermediate low voltage power switches and said two terminal low voltage power switches are switched at a frequency above 10 kHz.

7. The isolated DC-DC converter as defined in claim 1, wherein:
said circuit is a bidirectional rectifier/inverter circuit comprising an inductor connected in series with an AC port, a low voltage capacitor, two high voltage power switches connected between a first AC terminal and opposed ends of said high voltage capacitor, two intermediate low voltage power switches connected between said opposed ends of said high voltage capacitor and opposed ends of said low voltage capacitor, and two terminal low voltage power switches connected between said opposed ends of said low voltage capacitor and a second AC terminal; wherein a DC port can be connected to said opposed ends of said high voltage capacitor;
said controller is a first controller for a rectifier mode having at least one sensor for sensing current and/or voltage in said bidirectional rectifier/inverter and connected to a gate input of said two high voltage power switches, said two intermediate low voltage power switches and said two terminal low voltage power switches for causing said rectifier circuit to operate in a boost mode wherein a voltage of said high voltage capacitor is higher than a peak voltage of said AC port, and said two high voltage power switches are controlled to switch on and off at a frequency of said AC port, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said rectifier circuit supplying said DC load and absorbing power as a five-level active rectifier with low harmonics on said AC port; and
said power converter further comprises a second controller for an inverter mode connected to said two high voltage power switches, said two intermediate low voltage power switches and said two terminal low voltage power switches and configured to generate and apply to said two high voltage power switches, said two intermediate low voltage power switches and said two terminal low voltage power switches signal waveforms comprising a first control signal for causing said low voltage capacitor to be series connected with said DC port and said AC port and charged to a predetermined value proportional to a voltage of said DC port, and a second control signal for causing said low voltage capacitor to be disconnected from the DC port and series connected with the AC port, thereby causing the low voltage capacitor to be discharged.

8. The isolated DC-DC converter as defined in claim 1, wherein said isolated DC-DC converter is an on-board isolated DC-DC converter used in an electric or hybrid vehicle.

9. The isolated DC-DC converter as defined in claim 1, wherein the first converter working in the inverter mode provides AC current having a frequency of above 400 Hz.

10. The isolated DC-DC converter as defined in claim 1, wherein the first converter has a switching frequency of 20 kHz.

11. An isolated AC-DC converter comprising:
a first converter working in a rectifier mode receiving AC current and providing DC current;
a second converter working in an inverter mode receiving said DC current from said first converter and providing AC current having multilevel waveform;
a transformer receiving said AC current from said second converter having an input and an output, said transformer providing electric isolation between said input and output;
a third converter working in a rectifier mode receiving AC current from said transformer and providing DC current;
wherein at least one of said first, second and third converters is a multilevel converter.

12. The isolated AC-DC converter as defined in claim 11, wherein said multilevel converter comprises:
an AC port;
at least one DC port;
a power converter component connected to said AC and at least one DC port converting power between said AC port and said at least one DC port at a variable voltage, said power converter component comprising:
at least one high voltage capacitor for storing power at a voltage boosted above
a peak voltage of said AC port;
a circuit comprising:
an inductor connected in series with said AC port,
a low voltage capacitor,
one of:
two diodes connected between a first AC port terminal and opposed ends of said high voltage capacitor; and
two high voltage switches connected between a first AC port terminal and said opposed ends of said high voltage capacitor, two intermediate low voltage power switches connected between said opposed end of said high voltage capacitor and opposed ends of said low voltage capacitor, and two terminal low voltage power switches connected between said opposed ends of said low voltage capacitor and a second AC terminal, wherein said DC port can be connected to said opposed ends of said high voltage capacitor; and a controller having at least one sensor for sensing current and/or voltage in said circuit and connected to a gate input of said two intermediate low voltage power switches and said two terminal low voltage power switches.

13. The isolated AC-DC converter as defined in claim 12, wherein said controller is operative for causing said circuit to operate in a rectifier boost mode wherein a voltage of said high voltage capacitor is higher than a peak voltage of said AC port, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said circuit supplying a DC load and absorbing power as a five-level active rectifier with low harmonics on said AC port.

14. The isolated AC-DC converter as defined in claim 12, wherein said controller interface further communicates with an electric power storage battery and receives a desired charge current value, and said power converter is further responsive to said desired charge current value to convert power from said AC port to DC at a DC output at a variable current not exceeding said desired charge current value for a DC load.

15. The isolated AC-DC converter as defined in claim 12, further comprising a buck converter circuit for converting DC power from said opposed ends of said high voltage capacitor to a lower DC output voltage set by said charge voltage value.

16. The isolated AC-DC converter as defined in claim 12, further comprising a boost converter circuit for converting DC power from said opposed ends of said high voltage capacitor to a higher DC output voltage set by said charge voltage value.

17. The isolated AC-DC converter as defined in claim 12, wherein said two intermediate low voltage power switches and said two terminal low voltage power switches are switched at a frequency above 10 kHz.

18. The isolated AC-DC converter as defined in claim 12, wherein:

said circuit is a bidirectional rectifier/inverter circuit comprising an inductor connected in series with an AC port, a low voltage capacitor, two high voltage power switches connected between a first AC terminal and said opposed ends of said high voltage capacitor, two intermediate low voltage power switches connected between said opposed end of said high voltage capacitor and opposed ends of said low voltage capacitor, and two terminal low voltage power switches connected between said opposed ends of said low voltage capacitor and a second AC terminal; wherein a DC port can be connected to said opposed ends of said high voltage capacitor;

said controller is a first controller for a rectifier mode having at least one sensor for sensing current and/or voltage in said bidirectional rectifier/inverter and connected to a gate input of said two high voltage power switches, said two intermediate low voltage power switches and said two terminal low voltage power switches for causing said rectifier circuit to operate in a boost mode wherein a voltage of said high voltage capacitor is higher than a peak voltage of said AC port, and said two high voltage power switches are controlled to switch on and off at a frequency of said AC port, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said rectifier circuit supplying said DC load and absorbing power as a five-level active rectifier with low harmonics on said AC port; and said power converter further comprises a second controller for an inverter mode connected to said two high voltage power switches, said two intermediate low voltage power switches and said two terminal low voltage power switches and configured to generate and apply to said two high voltage power switches, said two intermediate low voltage power switches and said two terminal low voltage power switches signal waveforms comprising a first control signal for causing said low voltage capacitor to be series connected with said DC port and said AC port and charged to a predetermined value proportional to a voltage of said DC port, and a second control signal for causing said low voltage capacitor to be disconnected from the DC port and series connected with the AC port, thereby causing the low voltage capacitor to be discharged.

19. The isolated AC-DC converter as defined in claim 11, wherein said first converter has a diode bridge for unidirectional application.

20. The isolated AC-DC converter as defined in claim 11, wherein said isolated AC-DC converter is a bidirectional isolated converter.

21. The isolated AC-DC converter as defined in claim 11, wherein said first, second and third converters are multilevel converters and said isolated AC-DC converter works bidirectionally.

22. The isolated AC-DC converter as defined in claim 11, wherein said first converter has a diode bridge and a conventional DC-DC buck or boost converter to provide power factor correction.

23. The isolated AC-DC converter as defined in claim 11, wherein said first converter has an active Pulse Width Modulation rectifier to provide power factor correction.

24. The isolated AC-DC converter as defined in claim 11, wherein said isolated AC-DC converter is an on-board isolated AC-DC converter used in an electric or hybrid vehicle.

25. The isolated AC-DC converter as defined in claim 11, wherein the second converter provides AC current having a frequency of above 400 Hz.

26. The isolated AC-DC converter as defined in claim 11, wherein the second converter has a switching frequency of 20 kHz.

27. A method for providing electrical isolation using an isolated converter, the method comprising:

providing the isolated converter with a first DC current;

selecting a first output frequency for converting the first DC current to a first AC current;

converting the first DC current to the first AC current at the first output frequency using a first multilevel conversion circuit providing a multilevel voltage AC waveform;

providing the first AC current to a transformer having a size and receiving a second AC output current having electrical isolation from the first AC current;

wherein the size of the transformer providing isolation is determined based on said first output frequency of the first AC current.

28. The method as defined in claim 27, wherein the providing the isolated converter with the first DC current comprises:

receiving a third AC current having a third frequency lower than the first frequency of the first AC current:

converting the third AC current to the first DC current using a second converter circuit.

29. The method as defined in claim 28, wherein the multi-level converter circuit is a five-level active rectifier.

30. The method as defined in claim 27, wherein the converting the first DC current to the first AC current at the first output frequency using the first multilevel conversion circuit comprises providing said multilevel voltage AC waveform with harmonic suppression.

31. The method as defined in claim 27, further comprises converting the second AC current to second DC current using a third converter circuit.

* * * * *